(12) United States Patent
Inagaki et al.

(10) Patent No.: US 7,601,463 B2
(45) Date of Patent: Oct. 13, 2009

(54) NONAQUEOUS ELECTROLYTE SECONDARY BATTERY

(75) Inventors: Hiroki Inagaki, Kanagawa (JP);
Hideaki Morishima, Chiba (JP);
Yoshinao Tatebayashi, Kanagawa (JP);
Yuji Sato, Kanagawa (JP); Norio Takami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 674 days.

(21) Appl. No.: 11/148,169

(22) Filed: Jun. 9, 2005

(65) Prior Publication Data

US 2006/0046155 A1 Mar. 2, 2006

(30) Foreign Application Priority Data

Aug. 30, 2004 (JP) ............... 2004-250461

(51) Int. Cl.
*H01M 4/58* (2006.01)
(52) U.S. Cl. .............. 429/231.1; 429/231.3; 429/231.5; 429/221; 429/223; 429/224; 429/218.1; 429/232; 429/332; 429/330; 429/331
(58) Field of Classification Search ............ 429/218.1, 429/223, 224, 231.1, 232, 332, 330, 331, 429/231.5, 221, 231.3
See application file for complete search history.

(56) References Cited

U.S. PATENT DOCUMENTS

| | | | |
|---|---|---|---|
| 5,192,629 A | | 3/1993 | Guyomard et al. |
| 5,677,087 A | * | 10/1997 | Amine et al. ............... 429/224 |
| 6,174,627 B1 | * | 1/2001 | Ohta et al. .................. 429/332 |
| 2005/0064282 A1 | | 3/2005 | Inagaki et al. |
| 2005/0069777 A1 | | 3/2005 | Takami et al. |
| 2005/0221173 A1 | | 10/2005 | Tatebayashi et al. |
| 2005/0221187 A1 | | 10/2005 | Inagaki et al. |
| 2005/0221188 A1 | * | 10/2005 | Takami et al. ............. 429/231.5 |
| 2006/0134520 A1 | | 6/2006 | Ishii et al. |
| 2008/0070115 A1 | | 3/2008 | Saruwatari et al. |

FOREIGN PATENT DOCUMENTS

CN 1095191 A 11/1994

(Continued)

OTHER PUBLICATIONS

Kingo Ariyoshi, "Three-Volt Lithium-Ion Battery with Li[Ni$_{1/2}$Mn$_{3/2}$]O$_4$ and the Zero-Strain Insertion Material of Li[Li$_{1/3}$Ti$_{5/3}$]O$_4$", Journal of Power Sources, 119-121 (2003), pp. 959-963.

(Continued)

*Primary Examiner*—Laura S Weiner
(74) *Attorney, Agent, or Firm*—Oblon, Spivak, McClelland, Maier & Neustadt, L.L.P.

(57) ABSTRACT

A nonaqueous electrolyte secondary battery includes: an outer housing; a nonaqueous electrolyte filled in the outer housing, a positive electrode housed in the outer housing, a negative electrode housed in the outer housing and a separator disposed between the negative electrode and the positive electrode. The nonaqueous electrolyte comprises a nonaqueous solvent including diethyl carbonate and at least one of ethylene carbonate and propylene carbonate, and the nonaqueous electrolyte has a content of the diethyl carbonate of from 80 to 95% by volume. The positive electrode comprises a positive electrode active substance having a positive electrode potential in a full charged state of 4.4 V or higher with respect to a potential of metallic lithium. The negative electrode comprises a negative electrode active substance having a negative electrode potential in a full charged state of 1.0 V or higher with respect to a potential of metallic lithium.

13 Claims, 1 Drawing Sheet

FOREIGN PATENT DOCUMENTS

| | | |
|---|---|---|
| JP | 8-335465 | 12/1996 |
| JP | 11-185807 | 7/1999 |
| JP | 2000-515672 | 11/2000 |
| JP | 2001-210324 | 8/2001 |
| JP | 2002-352797 | 12/2002 |
| JP | 2003-86177 | 3/2003 |
| KR | 2003-0090529 | 11/2003 |

OTHER PUBLICATIONS

U.S. Appl. No. 11/387,776, filed Mar. 24, 2006, Inagaki, et al.
U.S. Appl. No. 11/470,482, filed Sep. 6, 2006, Takami, et al.
U.S. Appl. No. 11/531,142, filed Sep. 12, 2006, Morishima, et al.
U.S. Appl. No. 11/687,844, filed Mar. 19, 2007, Fujita, et al.
U.S. Appl. No. 11/687,860, filed Mar. 19, 2007, Fujita, et al.
U.S. Appl. No. 11/694,454, filed Mar. 30, 2007, Inagaki, et al.
U.S. Appl. No. 11/230,635, filed Sep. 21, 2005, Takami, et al.
U.S. Appl. No. 11/230,482, filed Sep. 21, 2005, Takami, et al.
U.S. Appl. No. 11/260,410, filed Oct. 28, 2005, Inagaki, et al.
U.S. Appl. No. 11/228,430, filed Sep. 19, 2005, Inagaki, et al.
U.S. Appl. No. 11/260,435, filed Oct. 28, 2005, Takami, et al.
U.S. Appl. No. 11/261,538, filed Oct. 31, 2005, Inagaki, et al.
U.S. Appl. No. 11/257,040, filed Oct. 25, 2005, Inagaki, et al.
U.S. Appl. No. 11/756,259, filed May 31, 2007, Saruwatari, et al.

* cited by examiner

US 7,601,463 B2

NONAQUEOUS ELECTROLYTE SECONDARY BATTERY

CROSS-REFERENCE TO RELATED APPLICATIONS

This application is based upon and claims the benefit of priority from the prior Japanese Patent Application No. 2004-250461, filed on Aug. 30, 2004, the entire contents of which are incorporated herein by reference.

BACKGROUND OF THE INVENTION

1. Field of the Invention

The present invention relates to Li ion nonaqueous electrolyte secondary battery.

2. Description of the Related Art

A nonaqueous electrolyte secondary battery that exerts charging and discharging through migration of Li ions between a negative electrode and a positive electrode is being actively developed as a high energy density battery.

A Li ion nonaqueous electrolyte secondary battery using lithium cobaltate as a positive electrode active substance and carbon as a negative electrode active substance is subjected to practical use, and the battery voltage thereof is about 3.8 V at most. As one measure for further improving the energy density, it is considered to increase the battery voltage.

There has been proposed such an attempt of using $LiMn_{1.5}Ni_{0.5}O_4$ having a positive electrode potential in a full charged state of about from 4.9 to 5.0 V (which is a potential with respect to metallic lithium, hereinafter, referred to as "vs. Li") (see JP-A-2000-515672). A combination of the positive electrode and a negative electrode using carbon having a negative electrode potential in a full charged state of about 0.1 V (vs. Li) as a negative electrode active substance realizes a nonaqueous electrolyte secondary battery having a battery voltage fairly close to 5 V.

For example, there has been disclosed a nonaqueous electrolyte secondary battery having the aforementioned positive electrode, a negative electrode using a Li—Sn alloy and carbon as a negative electrode active substance, and a nonaqueous solvent containing a mixture of 75% by volume or more of a linear ester, such as diethyl carbonate, and a cyclic ester, such as ethylene carbonate (see JP-A-2002-352797).

As a result of earnest investigations made by the inventors, it has been found as follows.

The aforementioned nonaqueous electrolyte secondary battery suffers oxidation decomposition of the nonaqueous electrolyte in the vicinity of the positive electrode in a high potential state. The product formed through the oxidation decomposition is accumulated or deposited on the negative electrode having a lower potential to produce a parasitic resistance. The nonaqueous electrolyte secondary battery is deteriorated in cycle capability, particularly high temperature cycle capability, due to the phenomenon.

BRIEF SUMMARY OF THE INVENTION

Under the circumstances, an object of the invention is to provide such a nonaqueous electrolyte secondary battery that is excellent in high temperature cycle capability.

According to an aspect of the invention, a nonaqueous electrolyte secondary battery includes: an outer housing; a nonaqueous electrolyte filled in the outer housing, a positive electrode housed in the outer housing, a negative electrode housed in the outer housing and a separator disposed between the negative electrode and the positive electrode. The nonaqueous electrolyte comprises a nonaqueous solvent including diethyl carbonate and at least one of ethylene carbonate and propylene carbonate, and the nonaqueous electrolyte has a content of the diethyl carbonate of from 80 to 95% by volume. The positive electrode comprises a positive electrode active substance having a positive electrode potential in a full charged state of 4.4 V or higher with respect to a potential of metallic lithium. The negative electrode comprises a negative electrode active substance having a negative electrode potential in a full charged state of 1.0 V or higher with respect to a potential of metallic lithium. The separator has the nonaqueous electrolyte impregnated therewith.

The full charged state herein means a state where a battery is charged to such an extent that the battery can discharge in a rated capacity (nominal capacity).

A nonaqueous electrolyte secondary battery excellent in high temperature cycle capability can be provided by the invention.

DETAILED DESCRIPTION OF THE INVENTION

Figure 1A:
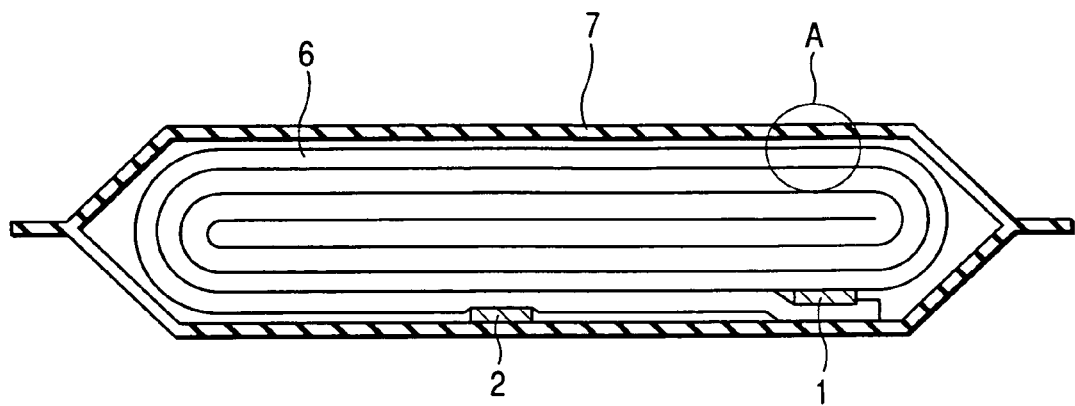
FIG. 1A is a schematic cross sectional view showing an example of a nonaqueous electrolyte secondary battery according to an embodiment of the invention.
Figure 1B:
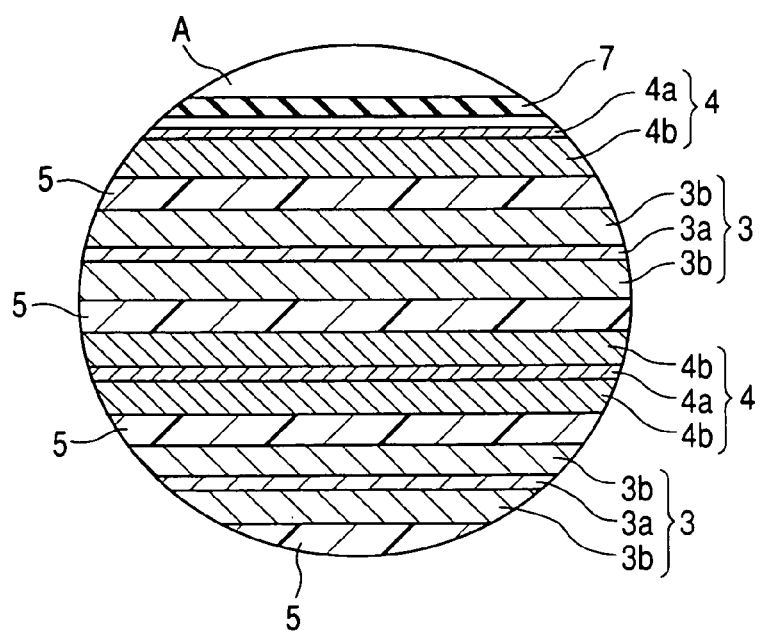
FIG. 1B is a partial schematic cross sectional view showing details of the circled part in FIG. 1A.

An example of the nonaqueous electrolyte secondary battery according to one embodiment of the invention will be described for the structure thereof with reference to FIGS. 1A and 1B. FIG. 1A is a schematic cross sectional view showing a flat nonaqueous electrolyte secondary battery according to the embodiment, and FIG. 1B is a partial schematic cross sectional view showing details of the circled part in FIG. 1A.

A positive electrode terminal 1 is attached to a positive electrode 3, and a negative electrode terminal 2 is attached to a negative electrode 4. The positive electrode 3 and the negative electrode 4 constitute a flat wound electrode 6 along with a separator 5 sandwiched between them. The wound electrode 6 is housed in an outer housing 7 having a nonaqueous electrolyte filled therein. The nonaqueous electrolyte, which is not shown in the figure, is prepared by dissolving an electrolyte in a nonaqueous solvent.

As shown in FIG. 1A, the flat wound electrode 6 is housed in the outer housing 7 having the nonaqueous electrolyte filled therein. In the vicinity of the outer circumferential end of the wound electrode 6, the negative electrode terminal 2 is attached to the outer side thereof, and the positive electrode terminal 1 is attached to the inner side thereof. While not shown in the figure, the wound electrode 6 is constituted in a layered form by the negative electrode 4, the separator 5, the positive electrode 3, and the separator 5 in this order from the outer layer.

The constitution of the wound electrode 6 will be described in more detail. As shown in FIG. 1B, the positive electrode 3 and the negative electrode 4 constitute a layered form along with the separator 5 sandwiched between them. The negative electrode 4 as the outermost layer is constituted in a layered form by a negative electrode collector 4a and a negative electrode layer 4b in this order from the outer layer, and the other negative electrodes 4 each is constituted in a layered form by a negative electrode layer 4b, a negative electrode collector 4a, and a negative electrode layer 4b in this order. The positive electrode 3 is constituted in a layered form by a positive electrode layer 3b, a positive electrode collector 3a, and a positive electrode layer 3b in this order.

The nonaqueous electrolyte, the positive electrode, the negative electrode, the separator and the outer housing will be described in detail below.

(1) Nonaqueous Electrolyte

Examples of the nonaqueous electrolyte include a liquid nonaqueous electrolyte prepared by dissolving an electrolyte in a nonaqueous solvent, and a gelled nonaqueous electrolyte formed by combining the liquid electrolyte and a polymer material.

The nonaqueous solvent used in the embodiment contains diethyl carbonate and at least one of propylene carbonate and diethyl carbonate, and the content of diethyl carbonate is from 80 to 95% by volume.

Diethyl carbonate contributes to lowering of oxidation decomposition of the nonaqueous solvent in the vicinity of the positive electrode. Ethylene carbonate or propylene carbonate contributes to improvement of the electroconductivity of the nonaqueous solvent, or improvement in discharging efficiency. In the case where the content of diethyl carbonate is in the range, the contributions of both the components are attained in a balanced manner to improve the high temperature cycle capability. The content of diethylcarbonate is more preferably from 85 to 90% by volume.

Examples of other components of the nonaqueous solvent include a cyclic carbonate, such as vinylene carbonate (VC), a linear carbonate, such as dimethyl carbonate (DMC) and methyl ethyl carbonate (MEC), a cyclic ether, such as tetrahydrofuran (THF) and 2-methyltetrahydrofuran (2MeTHF), a linear ether, such as dimethoxyethane (DME), acetonitrile (AM) and sulfolane (SL).

Examples of the electrolyte used in the embodiment include a lithium salt, such as lithium hexafluorophosphate ($LiPF_6$), lithium tetrafluoroborate ($LiBF_4$), lithium perchlorate ($LiClO_4$), lithium hexafluoroarsenic ($LiAsF_6$) and lithium trifluorometasulfonate ($LiCF_3SO_3$).

The electrolyte particularly preferably contains an imide lithium salt selected from the group consisting of $Li(CF_3SO_2)_2N$ (lithium perfluoromethylsulfonylimide), $Li(CF_3SO_2)(C_2F_5SO_2)N$ (lithium perfluoroethylmethylsulfonylimide) and $Li(C_2F_5SO_2)_2N$ (lithium perfluoroethylsulfonylimide).

The imide lithium salt appropriately suffers oxidation decomposition in the vicinity of the positive electrode in the initial charging to form a favorable film on the surface of the positive electrode. The film suppresses further oxidation decomposition of the nonaqueous electrolyte in the vicinity of the positive electrode in a high potential state, whereby the high temperature cycle capability is improved.

Furthermore, $Li(C_2F_5SO_2)_2N$ is preferably used since it hardly corrodes aluminum used as the positive electrode collector.

The imide lithium salt may be used as a mixture with another lithium salt, and in particular, it is preferred that $LiBF_4$ or $LiPF_6$ is mixed therewith.

In the case where an imide lithium salt is excessively added, in general, there are cases where the surface of the aluminum or aluminum ally foil used as the positive electrode collector is corroded. However, $LiBF_4$ (lithium tetrafluoroborate) or $LiPF_6$ (lithium tetrafluorophosphate) has higher effect on suppressing the corrosion caused by the imide lithium salt, and the use thereof can improve the high temperature cycle capability.

The content of the imide lithium salt is preferably from 2 to 50% by mole based on the total amount of the electrolyte from the standpoint of high temperature cycle capability.

In the case where the content of the imide lithium salt is less than 2% by mole, the effect of suppressing the oxidation decomposition of the nonaqueous electrolyte is insufficient, and in the case where the content exceeds 50% by mole, corrosion of aluminum becomes conspicuous. The content of the imide lithium salt is more preferably from 3 to 17% by mole.

Examples of the polymer material used in the gelled nonaqueous electrolyte include polyvinylidene fluoride (PVdF), polyacrylonitrile (PAN) and polyethylene oxide (PEO).

(2) Positive Electrode

The positive electrode has a positive electrode collector and a positive electrode layer, which is formed on one surface or both surfaces of the positive electrode collector and contains a positive electrode active substance, a positive electrode electroconductive agent and a binder.

The positive electrode active substance provides an operation potential of the positive electrode of 4.4 V or higher with respect to a potential of metallic lithium.

Examples of the positive electrode active substance include a lithium manganese complex oxide having a spinel structure, a lithium vanadium complex oxide having a spinel structure, and a lithium phosphate having olivine structure.

A lithium manganese complex oxide having a spinel structure is particularly preferred. Examples of the lithium manganese complex oxide having a spinel structure include a complex oxide represented by $Li_{1-x}Mn_{1.5-y}Ni_{0.5-z}M_{y+z}O_4$ (wherein $0 \leq x \leq 1$, $0 \leq y+z \leq 0.15$, and M represents at least one element selected from the group consisting of Mg, Al, Ti, Fe, Co, Ni, Cu, Zn, Ga, Nb, Sn, Zr and Ta).

$LiMn_{1.5}Ni_{0.5}O_4$ is preferably used as the positive electrode active substance from the standpoint of high temperature cycle capability. A part of Mn or Ni is preferably substituted by a hetero element from the standpoint of suppression of oxidation reaction of the nonaqueous electrolyte. Examples of the hetero element used for substitution include Mg, Al, Ti, Fe, Co, Ni, Cu, Zn, Ga, Nb, Sn, Zr and Ta, and the substitution by Mg, Al, Ti and Zr exerts higher effect on suppression of oxidation reaction of the nonaqueous electrolyte. The substitution amount (y+z) is preferably 0.01 or more from the standpoint of suppression of reaction with the electrolytic solution, and is preferably 0.15 or less from the standpoint of improvement in capacity. The substitution amount (y+z) is more preferably from 0.03 to 0.1.

While an overcharging potential is generally obtained, a lithium cobalt oxide ($LixCoO_2$) and the like may be used in the invention when the positive electrode potential in a full charged state is 4.4 V (vs. Li) or higher, and the similar effect can be exerted.

Examples of the positive electrode active substance include, a lithium cobalt oxide ($LixCoO_2$), a lithium manganese complex oxide (such as $LixMn_2O_4$ and $LixMnO_2$), a lithium nickel complex oxide (such as $LixNiO_2$), a lithium nickel cobalt complex oxide (such as $LiNi_{1-y}Co_yO_2$), a lithium manganese cobalt complex oxide (such as $LiMn_yCo_{1-y}O_2$), and a lithium phosphate having a olivine structure (such as $Li_xFePO_4$, $Li_xFe_{1-y}Mn_yPO_4$ and $Li_xCoPO_4$).

The nonaqueous electrolyte of the embodiment is decomposed at a potential of 5.5 V (vs. Li) or more. Therefore, the upper limit of the positive electrode potential in a full charged state is about 5.5 V (vs. Li).

Examples of the positive electrode electroconductive agent, which is used for improving the collecting function and for suppress the contact resistance with the collector, include a carbonaceous substance, such as acetylene black, carbon black and graphite.

The carbonaceous substance preferably has a plane distance of the (002) plane ($d_{002}$) of from 0.344 to 0.352 μm and an average particle diameter of from 0.1 to 10 μm from the standpoint of suppression of reaction with the nonaqueous electrolyte. Examples of the carbonaceous substance include coke having been baked at a temperature of about from 1,000 to 1,300° C.

Examples of the binder, which is used for binding the positive electrode active substance and the positive electrode electroconductive agent, include polytetrafluoroethylene (PTFE), polyvinylidene fluoride (PVdF) and fluorine rubber.

The mixing ratio of the positive electrode active substance, the positive electrode electroconductive agent and the binder is from 80 to 95% by weight for the positive electrode active substance, from 3 to 18% by weight for the positive electrode electroconductive agent, and from 2 to 17% by weight for the binder. In the case where the amount of the positive electrode electroconductive agent is 3% by weight or more, the aforementioned effect can be obtained, and in the case it is 18% by weight or less, the nonaqueous electrolyte can be suppressed from being decomposed on the surface of the positive electrode electroconductive agent upon storing at high temperatures. In the case where the amount of the binder is 2% by weight or more, a sufficient electrode strength can be obtained, and in the case it is 17% by weight or less, the mixing amount of insulating materials in the electrode is reduced to decrease the internal resistance.

The positive electrode collector is preferably an aluminum foil or an aluminum alloy foil containing such an element as Mg, Ti, Zn, Mn, Fe, Cu and Si. An aluminum alloy foil containing Mg or Si is particularly preferred from the standpoint of corrosion resistance to the imide lithium salt.

The positive electrode can be produced, for example, by such a method that the positive electrode active substance, the positive electrode electroconductive agent and the binder are suspended in a suitable solvent to obtain a slurry, which is coated and dried on the positive electrode collector to form a positive electrode layer, and then the resulting assembly is pressed. In alternative, it is possible that the positive electrode active substance, the positive electrode electroconductive agent and the binder are formed into pellets, which are used as the positive electrode layer.

(3) Negative Electrode

The negative electrode has a negative electrode collector and a negative electrode layer, which is formed on one surface or both surfaces of the negative electrode collector and contains a negative electrode active substance, a negative electrode electroconductive agent and a binder.

The negative electrode active substance has a negative electrode potential in a full charged state of 1.0 V (vs. Li) or higher. In general, a product formed through oxidation decomposition of the nonaqueous electrolyte in the vicinity of the positive electrode is accumulated or deposited on a surface of the negative electrode having a lower potential to produce a parasitic resistance. The accumulation or deposition of the oxidation decomposition product becomes conspicuous at a negative electrode potential of 1.0 V (vs. Li) or less. For example, the parasitic resistance is greatly increased in the case where carbon (having a negative electrode potential in a full charged state of about 0.1 V) is used as a negative electrode active substance. Therefore, a negative electrode active substance having a negative electrode potential in a full charged state of 1.0 V (vs. Li) or higher is used in the embodiment.

Examples of the negative electrode active substance include a lithium titanium complex oxide and a lithium iron complex sulfide, a lithium tungsten complex oxide, a lithium molybdenum complex oxide and a lithium titanium complex sulfide.

Among these, a lithium titanium complex oxide and a lithium iron complex sulfide are particularly preferred. This is because a film of an oxidation decomposition product is formed on the surface thereof relatively stably. Furthermore, lithium titanate represented by a chemical formula $Li_{4+x}Ti_5O_{12}$ ($0 \leqq x \leqq 3$) having a spinel structure is preferred from the standpoint of cycle capability. Lithium iron complex sulfide represented by $Li_xFeS_y$ ($0 \leqq x \leqq 4$, $0.9 \leqq y \leqq 2.1$) is preferred from the standpoint of improvement of the capacity.

In general, the nonaqueous electrolyte of the embodiment is decomposed at a potential of 5.5 V (vs. Li) or more. Therefore, in the case where a nonaqueous electrolyte secondary battery having a battery voltage (which is determined by (positive electrode potential)−(negative electrode potential)) of about 2.5 V, the upper limit of the negative electrode potential in a full charged state is about 3 V.

Examples of the negative electrode electroconductive agent include acetylene black, carbon black and graphite.

Examples of the binder, which is used for binding the negative electrode active substance and the negative electrode electroconductive agent, include polytetrafluoroethylene (PTFE), polyvinylidene fluoride (PVdF), fluorine rubber and styrene-butadiene rubber.

The mixing ratio of the negative electrode active substance, the negative electrode electroconductive agent and the binder is from 70 to 96% by weight for the negative electrode active substance, from 2 to 28% by weight for the negative electrode electroconductive agent, and from 2 to 28% by weight for the binder. In the case where the amount of the negative electrode electroconductive agent is less than 2% by weight, the collecting capability of the negative electrode layer is lowered to deteriorate the large current capability of the nonaqueous electrolyte secondary battery. In the case where the amount of the binder is less than 2% by weight, the binding property of the negative electrode layer and the negative electrode collector is lowered to deteriorate the cycle capability. The amounts of the negative electrode electroconductive agent and the binder are preferably 28% by weight or less, respectively, from the standpoint of improvement of the capacity.

The negative electrode layer preferably has a thickness of from 10 to 60 μm.

The thickness thereof is preferably 10 μm or more from the standpoint of improvement of the capacity, and is preferably 60 μm or less, whereby the adverse affect due to accumulation or deposition of the oxidation decomposition product of the nonaqueous electrolyte is reduced to lower the parasitic resistance.

The negative electrode collector is preferably an aluminum foil or an aluminum alloy foil containing such an element as Mg, Ti, Zn, Mn, Fe, Cu and Si, since they are electrochemically stable in a potential range of 1.0 V or higher.

The negative electrode can be produced, for example, by such a method that the negative electrode active substance, the negative electrode electroconductive agent and the binder are suspended in an ordinary solvent to obtain a slurry, which is coated and dried on the negative electrode collector to form a negative electrode layer, and then the resulting assembly is pressed. In alternative, it is possible that the negative electrode active substance, the negative electrode electroconductive agent and the binder may be formed into pellets, which are used as the negative electrode layer.

(4) Separator

Examples of the separator include a porous film containing polyethylene, polypropylene, cellulose or polyvinylidene fluoride (PVdF), and a nonwoven fabric comprising a synthetic resin. Among these, a porous film comprising polyethylene or polypropylene is preferred from the standpoint of safety because these materials are melted at a certain temperature to cut off an electric current.

(5) Outer Housing

Examples of the outer housing include a laminated film having a thickness of 0.2 mm or less and a metallic container having a thickness of 0.5 mm or less. The thickness is more preferably 0.2 mm or less. Examples of the shape of the outer housing include a flat form, a rectangular form, a cylindrical form, a coin form, a button form, a sheet form and a layered form. The nonaqueous electrolyte secondary battery may be fabricated as a small size battery mounted on a portable electronic device and the like, and also fabricated as a large size battery mounted on a two-wheel or four-wheel vehicle and the like.

The nonaqueous electrolyte secondary battery of the invention is particularly suitable for a battery for a vehicle, which is assumed to be used under a high temperature environment, owing to the excellent high temperature cycle capability thereof.

The laminated film may be a multilayer film containing a metallic layer and a resin layer coating the metallic layer. The metallic layer is preferably an aluminum foil or an aluminum alloy foil for reducing the weight. The resin layer is used for reinforcing the metallic layer, and examples of materials therefor include polypropylene (PP), polyethylene (PE), nylon and polyethylene terephthalate. The laminated film can be produced by sealing under heat.

Examples of the metallic container include those comprising aluminum and an aluminum alloy. Preferred examples of the aluminum alloy include alloys containing magnesium, zinc or silicon. The content of a transition metal, such as iron, copper, nickel and chromium, is preferably 100 ppm or less.

An outer housing having flexibility, such as a laminated film, is suitable in the invention since there are some cases where the outer housing is expanded due to gas generation associated with oxidation decomposition of the nonaqueous electrolyte.

EXAMPLE

The invention will be described in more detail with reference to the following examples, but the invention is not construed as being limited thereto unless it goes beyond the scope and the spirit of the invention.

Nonaqueous electrolyte secondary batterys of Examples and Comparative Examples were produced in the following manner.

Examples A1 to A17 and Comparative Examples A1 to A8

Production of Positive Electrode

Lithium manganese nickel complex oxide ($LiMn_{1.5}Ni_{0.45}Mg_{0.05}O_4$) as a positive electrode active substance, coke having been baked at 1,200° C. ($d_{002}$=0.347 μm, average particle diameter: 5 μm) as a positive electrode electroconductive agent, and polyvinylidene fluoride (PVdF) as a binder in a weight ratio of 90/5/5 were added to and mixed with N-methylpyrrolidone (NMP), and the resulting slurry was coated on both surfaces of a positive electrode collector comprising an aluminum foil having a thickness of 15 μm. The coated layer was dried and pressed to produce a positive electrode having an electrode density of 2.8 g/cm³.

Production of Negative Electrode

Lithium titanium complex oxide ($Li_4Ti_5O_{12}$) as a negative electrode active substance, coke having been baked at 1,200° C. ($d_{002}$=0.347 μm, average particle diameter: 5 μm) as a negative electrode electroconductive agent, and polyvinylidene fluoride (PVdF) as a binder in a weight ratio of 90/5/5 were added to and mixed with N-methylpyrrolidone (NMP), and the resulting slurry was coated on both surfaces of a negative electrode collector comprising an aluminum foil having a thickness of 15 μm. The coated layer was dried and pressed to produce a negative electrode having an electrode density of 2.4 g/cm³.

Production of Electrode Group

The positive electrode, a separator formed of a polyethylene porous film having a thickness of 25 μm, the negative electrode, and the same separator were laminated in this order and wound in a spiral form. The assembly was pressed under heating at about 90° C. to produce a flat electrode group having a width of 30 mm and a thickness of 3.0 mm. The resulting electrode group was housed in a housing formed of a laminated film having a thickness of 0.1 mm and dried in vacuum at about 80° C. for 24 hours.

Preparation of Liquid Nonaqueous Electrolyte

The electrolyte shown in Table 1 below was dissolved in the nonaqueous solvent shown in Table 1 to prepare a liquid nonaqueous electrolyte.

Production of Nonaqueous Electrolyte Secondary Battery

The liquid nonaqueous electrolyte was filled in the laminated film housing having the electrode group housed therein, and the housing was completely sealed with a heat seal to produce a nonaqueous electrolyte secondary battery having the structure shown in FIGS. 1A and 1B and having a width of 35 mm, a thickness of 3.2 mm and a height of 65 mm.

The batteries of Examples A1 to A17 and Comparative Examples A1 to A8 were subjected to a charging and discharging cycle test, in which charging at 1 C and 3.4 V (2 hours) and discharging at 1 C until the battery voltage was lowered by 2 V were repeated in 200 cycles under an environment at 45° C. In Examples and Comparative Examples, a ratio (%) of the discharging capacity in the 200th cycle to the discharge capacity in the first cycle was calculated and designated as a capacity maintenance ratio. The test results are shown in Table 1.

In Examples and Comparative Examples, the positive electrode potential was 4.9 V (vs. Li) and the negative electrode potential was 1.5 V (vs. Li), in a full charged state.

TABLE 1

| | Nonaqueous solvent | | | | | Electrolyte | | Content of Li(C$_2$F$_5$SO$_2$)$_2$N (% by mole) | Capacity maintenance ratio (%) |
|---|---|---|---|---|---|---|---|---|---|
| | EC (% by volume) | PC (% by volume) | DEC (% by volume) | MEC (% by volume) | DMC (% by volume) | LiPF$_6$ (mole/L) | Li(C$_2$F$_5$SO$_2$)$_2$N (mole/L) | | |
| Comparative Example A1 | 50 | — | 50 | — | — | 1.0 | — | — | 25 |
| Comparative Example A2 | 30 | — | 70 | — | — | 1.0 | — | — | 30 |
| Comparative Example A3 | 25 | — | 75 | — | — | 1.0 | — | — | 40 |
| Example A1 | 20 | — | 80 | — | — | 1.0 | — | — | 70 |
| Example A2 | 15 | — | 85 | — | — | 1.0 | — | — | 73 |
| Example A3 | 10 | — | 90 | — | — | 1.0 | — | — | 75 |
| Example A4 | 5 | — | 95 | — | — | 1.0 | — | — | 71 |
| Comparative Example A4 | 1 | — | 99 | — | — | 1.0 | — | — | 25 |
| Example A5 | 5 | 5 | 90 | — | — | 1.0 | — | — | 73 |
| Example A6 | 5 | — | 90 | 5 | — | 1.0 | — | — | 72 |
| Example A7 | 10 | — | 90 | — | — | 1.5 | — | — | 73 |
| Example A8 | 10 | — | 90 | — | — | 1.0 | 0.01 | 1 | 75 |
| Example A9 | 10 | — | 90 | — | — | 1.0 | 0.02 | 2 | 85 |
| Example A10 | 10 | — | 90 | — | — | 1.0 | 0.03 | 3 | 87 |
| Example A11 | 10 | — | 90 | — | — | 1.0 | 0.05 | 5 | 90 |
| Example A12 | 10 | — | 90 | — | — | 1.0 | 0.1 | 9 | 90 |
| Example A13 | 10 | — | 90 | — | — | 1.0 | 0.2 | 17 | 87 |
| Example A14 | 10 | — | 90 | — | — | 1.0 | 0.3 | 23 | 86 |
| Example A15 | 10 | — | 90 | — | — | 1.0 | 0.5 | 33 | 82 |
| Example A16 | 10 | — | 90 | — | — | 1.0 | 1 | 50 | 80 |
| Example A17 | 10 | — | 90 | — | — | 1.0 | 1.5 | 60 | 75 |
| Comparative Example A5 | 10 | — | — | 90 | — | 1.0 | — | — | 40 |
| Comparative Example A6 | 10 | — | — | 90 | — | 1.0 | 0.1 | 9.1 | 42 |
| Comparative Example A7 | 10 | — | — | — | 90 | 1.0 | — | — | 35 |
| Comparative Example A8 | 10 | — | — | — | 90 | 1.0 | 0.1 | 9.1 | 35 |

Note:
Content of Li(C$_2$F$_5$SO$_2$)$_2$N is a content thereof (mole/L) based on the total content of the electrolyte (mole/L).

In Table 1, EC represents ethylene carbonate, PC represents propylene carbonate, DEC represents diethyl carbonate, MEC represents methylethyl carbonate, and DMC represents dimethyl carbonate.

As shown in Table 1, Examples A1 to A4 are high in capacity maintenance ratio in comparison to Comparative Examples A1 to A8. Therefore, it is understood that the high temperature cycle capability is improved in the case where the content of diethyl carbonate in the nonaqueous solvent is from 80 to 95% by volume.

Examples A2 and A3 are high in capacity maintenance ratio in comparison to Examples A1 and A4. Therefore, it is understood that the high temperature cycle capability is further improved in the case where the content of diethyl carbonate in the nonaqueous solvent is from 85 to 90% by volume.

The Examples A3, A5 and A6 have capacity maintenance ratios equivalent to each other. Therefore, it is understood that the similar effect can be obtained in the case where PC or MEC is used instead of EC.

Examples A8 to A17 have capacity maintenance ratios equivalent to or higher than that of Example A3. Therefore, it is understood that the high temperature characteristics can be further improved in the case where an imide lithium salt, such as Li(C$_2$F$_5$SO$_2$)$_2$N, is used as the electrolyte.

Example A7 is lower in capacity maintenance ratio than Example A15. Therefore, it is understood that the effect of improving the capacity maintenance ratio is ascribed to the imide lithium salt rather than the total amount of the electrolyte.

Examples A9 to A16 are high in capacity maintenance ratio in comparison to Examples A8 and A17. Therefore, it is understood that the high temperature cycle capability is further improved in the case where the content of the imide lithium salt, such as Li(C$_2$F$_5$SO$_2$)$_2$N, is from 2 to 50% by mole.

Examples A10 to A13 are high in capacity maintenance ratio in comparison to Examples A8, A9 and A14 to A17. Therefore, it is understood that the high temperature cycle capability is still further improved in the case where the content of the imide lithium salt, such as Li(C$_2$F$_5$SO$_2$)$_2$N, is from 3 to 17% by mole.

Examples A3 and A12 are high in capacity maintenance ratio in comparison to Comparative Examples A5 to A8. Therefore, it is understood that DEC is excellent in high temperature cycle capability in comparison to MEC and DMC.

Example A12 is high in capacity maintenance ratio in comparison to Example A3. However, Comparative Examples A6 and A5 have capacity maintenance ratios equivalent to each other, and Comparative Examples A8 and A7 also have capacity maintenance ratios equivalent to each other. Therefore, it is understood that the use of the imide lithium salt, such as $Li(C_2F_5SO_2)_2N$, particularly improves the high temperature cycle capability in the case where the nonaqueous solvent is DEC.

Examples B1 to B17 and Comparative Examples B1 to B8

Nonaqueous electrolyte secondary batterys were produced in the same manner as in Example A1 except that iron sulfide (FeS) was used as the negative electrode active substance, and the nonaqueous electrolyte was prepared according to Table 2 below.

The batteries of Examples B1 to B17 and Comparative Examples B1 to B8 were subjected to a charging and discharging cycle test, in which charging at 1 C and 3.3 V (2 hours) and discharging at 1 C until the battery voltage was lowered by 1.5 V were repeated in 200 cycles under an environment at 45° C. The test results are shown in Table 2.

In Examples and Comparative Examples, the positive electrode potential was 4.9 V (vs. Li) and the negative electrode potential was 1.6 V (vs. Li), in a full charged state.

As shown in Table 2, the similar results as in Examples A1 to A17 and Comparative Examples A1 to A8 were obtained.

While the embodiments of the invention have been described, the invention is not limited to them and can be variously modified within the scope of the invention. The invention can be variously modified upon implementation unless departing from the spirits thereof. Various embodiments of the invention can be obtained by variously combining the plural constitutional elements disclosed as the embodiments.

What is claimed is:

1. A nonaqueous electrolyte secondary battery, comprising:
    an outer housing;
    a nonaqueous electrolyte which fills the outer housing, the nonaqueous electrolyte comprising a nonaqueous solvent of diethyl carbonate and at least one of ethylene carbonate or propylene carbonate, the nonaqueous electrolyte having a diethyl carbonate content of 80 to 95% by volume;
    a positive electrode housed in the outer housing, the positive electrode comprising a positive electrode active substance having a positive electrode potential in the fully charged state of 4.4 V or higher with respect to a potential of metallic lithium;

TABLE 2

| | Nonaqueous solvent | | | | | Electrolyte | | Content of | Capacity maintenance |
|---|---|---|---|---|---|---|---|---|---|
| | EC | PC | DEC | MEC | DMC | $LiPF_6$ | $Li(C_2F_5SO_2)_2N$ | $Li(C_2F_5SO_2)_2N$ | ratio |
| | (% by volume) | (% by volume) | (% by volume) | (% by volume) | (% by volume) | (mole/L) | (mole/L) | (% by mole) | (%) |
| Comparative Example B1 | 50 | — | 50 | — | — | 1.0 | — | — | 20 |
| Comparative Example B2 | 30 | — | 70 | — | — | 1.0 | — | — | 25 |
| Comparative Example B3 | 25 | — | 75 | — | — | 1.0 | — | — | 35 |
| Example B1 | 20 | — | 80 | — | — | 1.0 | — | — | 67 |
| Example B2 | 15 | — | 85 | — | — | 1.0 | — | — | 70 |
| Example B3 | 10 | — | 90 | — | — | 1.0 | — | — | 73 |
| Example B4 | 5 | — | 95 | — | — | 1.0 | — | — | 69 |
| Comparative Example B4 | 1 | — | 99 | — | — | 1.0 | — | — | 25 |
| Example B5 | 5 | 5 | 90 | — | — | 1.0 | — | — | 73 |
| Example B6 | 5 | — | 90 | 5 | — | 1.0 | — | — | 72 |
| Example B7 | 10 | — | 90 | — | — | 1.5 | — | — | 70 |
| Example B8 | 10 | — | 90 | — | — | 1.0 | 0.01 | 1 | 72 |
| Example B9 | 10 | — | 90 | — | — | 1.0 | 0.02 | 2 | 78 |
| Example B10 | 10 | — | 90 | — | — | 1.0 | 0.03 | 3 | 82 |
| Example B11 | 10 | — | 90 | — | — | 1.0 | 0.05 | 5 | 84 |
| Example B12 | 10 | — | 90 | — | — | 1.0 | 0.1 | 9 | 85 |
| Example B13 | 10 | — | 90 | — | — | 1.0 | 0.2 | 17 | 82 |
| Example B14 | 10 | — | 90 | — | — | 1.0 | 0.3 | 23 | 80 |
| Example B15 | 10 | — | 90 | — | — | 1.0 | 0.5 | 33 | 77 |
| Example B16 | 10 | — | 90 | — | — | 1.0 | 1 | 50 | 76 |
| Example B17 | 10 | — | 90 | — | — | 1.0 | 1.5 | 60 | 75 |
| Comparative Example B5 | 10 | — | — | 90 | — | 1.0 | — | — | 32 |
| Comparative Example B6 | 10 | — | — | 90 | — | 1.0 | 0.1 | 9.1 | 34 |
| Comparative Example B7 | 10 | — | — | — | 90 | 1.0 | — | — | 30 |
| Comparative Example B8 | 10 | — | — | — | 90 | 1.0 | 0.1 | 9.1 | 32 |

Note:
Content of $Li(C_2F_5SO_2)_2N$ is a content thereof (mole/L) based on the total content of the electrolyte (mole/L).

a negative electrode housed in the outer housing, the negative electrode comprising a negative electrode active substance, which is at least one of a lithium titanium complex oxide or a lithium iron complex sulfide, having a negative electrode potential in the fully charged state of 1.0 V or higher with respect to the potential of metallic lithium; and a separator disposed between the negative electrode and the positive electrode, the separator being impregnated with the nonaqueous electrolyte, wherein the positive electrode active substance comprises at least one material selected from the group consisting of $LiCoO_2$, $LiMnO_2$, $LiMn_2O_4$, $LiNiO_2$, $LiAlO_2$, $LiNi_{1/3}Mn_{1/3}Co_{1/3}O_2$, $LiNi_{0.75}Co_{0.20}Al_{0.05}O_2$, $LiNi_{0.5}Mn_{0.5}O_2$, $LiNi_{1-y}Co_yO_2$, $LiMn_yCo_{1-y}O_2$, and $Li_{1-x}Mn_{1.5-y}Ni_{0.5-z}M_{y+z}O_4$, where y for $LiNi_{1-y}Co_yO_2$ and $LiMn_yCo_{1-y}O_2$ satisfies $0<y<1$, and M for $Li_{1-x}Mn_{1.5-y}Ni_{0.5-z}M_{y+z}O_4$ is at least one element selected from the group consisting of Mg, Al, Ti, Fe, Go, Ni, Cu, Zn, Ga, Nb, Sn, Zr and Ta; $0 \leq x \leq 1$ and $0 \leq y+z \leq 0.15$.

2. The nonaqueous electrolyte secondary battery according to claim 1, wherein the nonaqueous electrolyte comprises an electrolyte including an imide lithium salt selected from the group consisting of $Li(CF_3SO_2)_2N$, $Li(CF_3SO_2)(C_2F_5SO_2)N$ and $Li(C_2F_5SO_2)_2N$, the electrolyte dissolved in the nonaqueous solvent.

3. The nonaqueous electrolyte secondary battery according to claim 2, wherein a content of the imide lithium salt is from 2 to 50% by mole based on the total content of the electrolyte.

4. The nonaqueous electrolyte secondary battery according to claim 1, wherein the electrolyte comprises at least one of $LiBF_4$ and $LiPF_6$.

5. The nonaqueous electrolyte secondary battery according to claim 1, wherein the negative electrode comprises a negative electrode collector and a negative electrode layer formed on at least one surface of the negative electrode collector, the negative electrode layer having a thickness of ranging from 10 to 60 μm, and the negative electrode layer comprising the negative electrode active substance, a negative electrode electroconductive agent and a binder.

6. The nonaqueous electrolyte secondary battery according to claim 1, wherein the positive electrode further comprises a positive electrode electroconductive agent and a binder.

7. The nonaqueous electrolyte secondary battery according to claim 6, wherein the positive electrode electroconductive agent comprises a carbonaceous substance having a plane distance of the (002) plane ($d_{002}$) ranging from 0.344 to 0.352 μm and an average particle diameter ranging from 0.1 to 10 μm.

8. The nonaqueous electrolyte secondary battery according to claim 1, wherein the lithium titanium complex oxide comprises a complex oxide expressed by $Li_{4+x}Ti_5O_{12}$, where $0 \leq x \leq 3$.

9. The nonaqueous electrolyte secondary battery according to claim 1, wherein the lithium iron complex sulfide comprises a complex sulfide expressed by $Li_xFeS_y$:

where $0 \leq x \leq 4$, $0.9 \leq y \leq 2.1$.

10. The nonaqueous electrolyte secondary battery according to claim 1, wherein the outer housing comprises a laminated film.

11. The nonaqueous electrolyte secondary battery according to claim 10, wherein the laminated film has a thickness of 0.2 mm or less.

12. The nonaqueous electrolyte secondary battery according to claim 10, wherein the laminated film is a multilayer film containing a metallic layer and a resin layer coating the metallic layer.

13. The nonaqueous electrolyte secondary battery according to claim 1, wherein the content of the diethyl carbonate in the nonaqueous solvent ranges from 85 to 90% by volume.

* * * * *